UNITED STATES PATENT OFFICE.

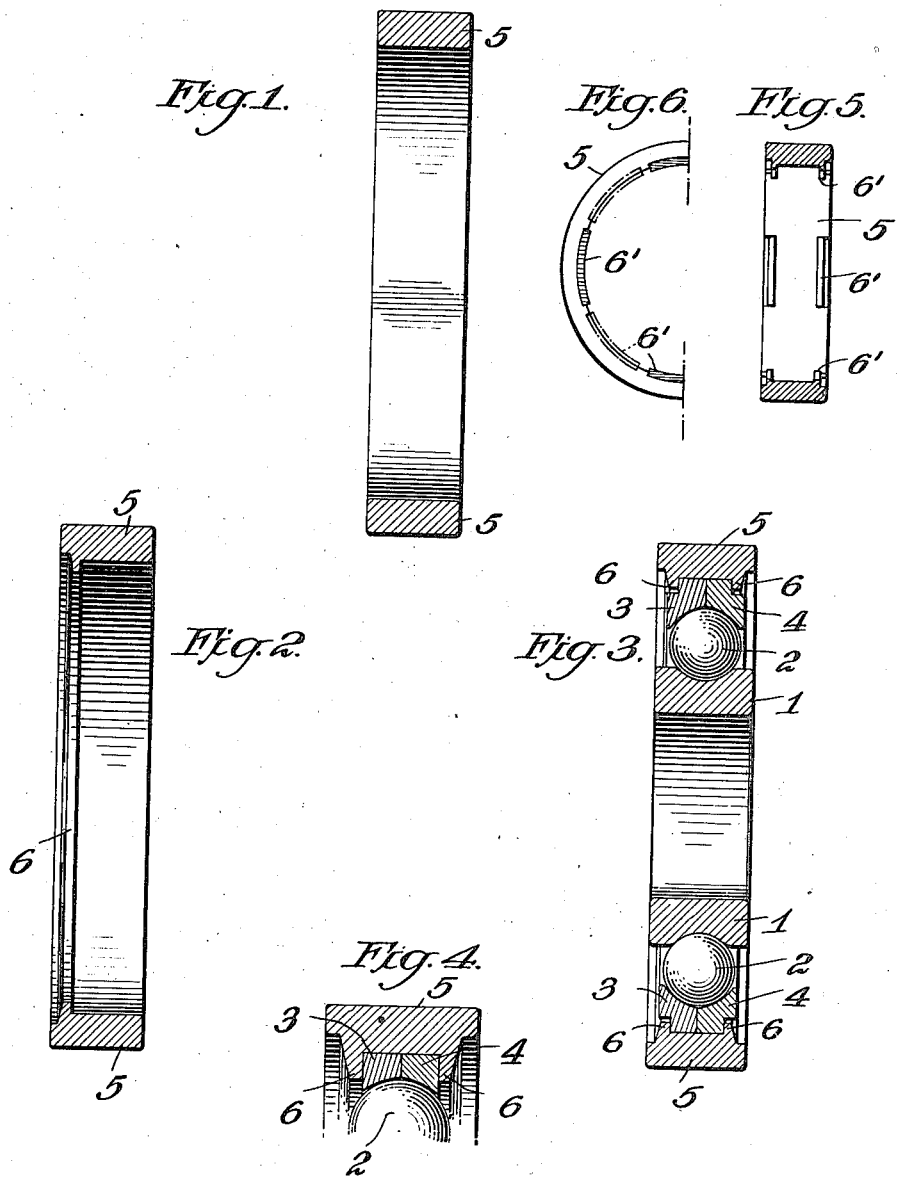

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

PROCESS OF MANUFACTURING ANTIFRICTION-BEARINGS.

1,301,323.          Specification of Letters Patent.         Patented Apr. 22, 1919.

Original application filed January 10, 1918, Serial No. 211,125. Divided and this application filed September 21, 1918. Serial No. 255,066.

*To all whom it may concern:*

Be it known that I, JOHN W. SCHATZ, a citizen of the United States, and a resident of the city of Poughkeepsie, county of Dutchess, and State of New York, have invented a new and useful Improvement in Processes of Manufacturing Antifriction-Bearings, of which the following is a specification, reference being had to the accompanying drawings.

I do not herein claim the bearing produced by my new process of manufacture since it is claimed in my original application, Serial No. 211,125, filed January 10, 1918, of which this application is a division; but I do not disclaim or abandon the same.

The use of anti-friction bearings of various constructions has enormously extended during recent years, their adaptability to various forms of mechanism for the accomplishment of various results having been more and more recognized as the perfection in their manufacture and their reduced cost have from time to time developed, so that at the present time large numbers of such bearings are used as anti-friction supports for a rotating shaft, axle, or equivalent member, and other large numbers are made annular in form and are employed under circumstances in which the shaft or axis is stationary, and the bearing rotates about it, after the fashion of a wheel or roller, its annular exterior surface or periphery acting as the tread thereof. My invention, while useful in ball bearings adapted to various uses, more especially relates to bearings adapted to this latter use, and generally stated, it consists in so making the structure that its parts shall be few, solid and enduring and particularly, that its outer peripheral part shall be of increased thickness, compared with bearings of the same class as heretofore made, so that its annular outer or peripheral surface shall be able to withstand long continued use and wear without such reduction in thickness and consequent strength as will result in weakening the bearing as a unit. My invention also contemplates the use of such weight or body of material in the outer annular casing or jacket of the bearing as that the wear-taking or tread surface thereof shall be capable of case hardening, or equivalent treatment, and yet its inner portions remain sufficiently soft to permit of shearing or swaging operations. My invention also contemplates the employment of a plurality of external cup rings made from solid material in conjunction with a single, solid cone or inner race ring.

Referring to the drawings, Figure 1 is an edgewise vertical sectional view of the jacket or exterior confining ring in its primary condition; Fig. 2 is a view similar to Fig. 1, one of the inwardly projecting ledges for supporting the exterior cup rings having been formed on one edge of the jacket; Fig. 3 is a view similar to Figs. 1 and 2, showing the bearing assembled into a unit, or self-contained structure complete within itself, the jacket having both of the inwardly projecting ledges formed thereon, whereby the parts are held in position; Fig. 4 is a vertical sectional view, partly broken away, showing a modified construction; Fig. 5 is a vertical sectional view, reduced in size as compared with the other views, of still another modified construction; Fig. 6 is a face view of that which is shown in Fig. 5.

1, see Fig. 3, is the cone or inner race ring. In the example shown, it is made of a single integral piece. 2, 2, are the balls, 3 and 4 the outer cup rings, 5 the exterior jacket or confining ring.

In the manufacture of the bearing, the jacket is in the first instance in the form shown in Fig. 1, that is to say, it is an integral annulus or ring, which may be made in such manner as desired, but preferably cut from a steel tube of proper quality and of the desired diameter, or drawn out from a flat sheet of suitable material into cup shape, which is developed into a ring of the required dimensions by suitable punching and turning operations, the thickness of the ring being such as will be appropriate for the desired bearing.

As the first operation, the ring shown in Fig. 1, while suitably supported by exterior and interior resistance surfaces, or anvils, is subjected to the action of appropriately constructed shearing and swaging devices, with the result shown in Fig. 2, in which an interior annular flange or ledge 6 has by the shearing and swaging operation been formed upon the interior of the ring from the stock or metal displaced from the adjacent inner corner or edge of the ring, the tools with which this work is done being made with such accuracy and the power exerted being such that no machining, either of the ring or the ledge 6, is necessary, although such may be employed, if desired. The outer cup rings 3 and 4, are made from solid stock under the operation of suitable dies, or by turning or by hot or cold forging from bar stock, or otherwise, as preferred, they are formed into the shape shown best in Fig. 3, that is to say, upon the inner annular surface of each cup ring there is formed one half the outer seat or race for the balls, the same being of such shape in cross section as preferred, and upon the outer surface of each is preferably formed an annular recess or shoulder, as shown, adapted to fit against and be supported by the ledges or flanges 6 formed on the interior of the jacket or outer ring.

In assembling the bearing I adopt the following method or process.

The jacket 5 having been subjected to the swaging and shearing operation, which has resulted in the formation of the inwardly projecting ledge 6, as shown in Fig. 2, is placed on a suitable horizontal support, with the ledge downward. Thereupon one of the cup rings, for example, the cup ring 3, is placed in the jacket, which may easily be done because the ledge or flange 6 on the upper side of the jacket has not yet been formed. The cup ring is then pressed downwardly through the jacket until it rests snugly against the ledge or flange 6. The cone or inner race 1 is then located centrally within the jacket 5, the balls 2, 2, are then introduced, the second cup ring 4 is then in turn placed within the jacket 5 and is pressed downwardly into contact with the appropriate surface of the cup ring 3, which was first introduced. Thereupon, with the parts thus assembled, the jacket is again subjected to the action of the shearing and swaging devices, and the remaining ledge or flange 6 upon the opposite edge of the jacket is formed, as shown in Fig. 3. The construction and manipulation of the tools employed and of the means for centering and supporting the several parts of the assembled unitary bearing, are all so exact that there results a perfect and reliable holding of all its members; and it will be particularly noted that at the appropriate time I can case harden or otherwise suitably treat the entire peripheral half of the jacket 5, thus greatly increasing its wear-resisting qualities and still keep the interior half, where the shearing and swaging operations are performed, sufficiently soft for that purpose. This is an important and very valuable phase of my invention, because thereby I am enabled to use my bearing as a roller or wheel without its receiving for an indefinite period any appreciable wear or being otherwise acted upon in such manner that its holding and binding action would be injuriously affected.

In Fig. 4 I show a construction the same in principle, but slightly different in details, from that illustrated in the other figures. In it I designate the parts with the same reference numerals and call attention merely to the fact that the outer cup rings 3 and 4 are in this construction made somewhat smaller than in the other figures and their support by the ledges or flanges 6, 6, is somewhat increased, thus enabling them better to withstand axial thrusts. I prefer, but this is not essential, that the cup rings and likewise the cone or inner race ring, should be made from open hearth, carbon, or alloy steel, suitably heat treated, hardened and tempered.

In the manufacture of relatively large bearings, I sometimes facilitate the procedure and avoid certain mechanical difficulties by making the inwardly projecting ledges in sections, as shown in Figs. 5 and 6. These sections may be as many in number and spaced as far apart as preferred. In these figures I show in full lines the ledges 6' made in four separated sections, or parts. In Fig. 6 I show in broken lines additional sections located between those shown in full lines, thus indicating that the number of the sections and the extent to which they are spaced from each other is entirely a matter of preference.

It will be noted that my bearing is a unitary or self-contained structure adapted to be combined bodily with any appropriate parts or members of another machine or structure, that it is unusually inexpensive to manufacture and is durable in construction, and that it is peculiarly adapted to operate as a roller or wheel, owing to its annular exterior holding member, which serves as the tread or wearing surface, being thick and heavy in construction, its outer or peripheral surface being specially hardened, if desired. The improved bearing may, of course, be given any preferred finish or degree of accuracy, that is to say, it may be co-called "unground," "semi-ground" or "full ground."

It will be obvious to those who are familiar with such matters that within the scope of the claims the details of construction may be departed from and still the essentials of the invention be retained.

I claim:

1. The described process of manufacturing an annular anti-friction bearing, consisting in shearing and swaging an integral steel ring or jacket at one of its inner edges in such manner as to form thereon an interiorly projecting ledge, forming two annular cup rings adapted to fit within the jacket and against said ledge and conjointly to constitute the outer race, forming a cone or interior race ring, assembling the said parts together with suitable balls into a unitary, self-contained bearing and permanently holding them as so assembled by forming on interiorly projecting ledge upon the opposite inner edge of the jacket and pressing it against the adjoining cup ring.

2. The described process of manufacturing an annular anti-friction bearing, consisting in shearing and swaging an integral steel ring or jacket at one of its inner edges in such manner as to form thereon an interiorly projecting ledge, hardening the peripheral surface of the jacket, forming two annular cup rings adapted to fit within the jacket and against said ledge and conjointly to constitute the outer race, forming a cone or interior race ring, assembling the said parts together with suitable balls and permanently holding them as a unitary, self-contained bearing by pressing a part of the opposite edge of the jacket upon and against the adjoining cup ring.

3. The described process of manufacturing an annular anti-friction bearing, consisting in shearing and swaging an integral steel ring or jacket at its opposite inner edges so as to form thereon near one of its edges interiorly projecting means for the support of the cup rings, forming two annular cup rings adapted to fit within the jacket and conjointly to constitute the outer race, forming a cone or interior race ring and suitable balls, and assembling the said parts by first placing one of said annular cup rings within the ring jacket and against the said interiorly projecting supporting means thereon, second, centering the cone or interior race ring within the jacket, third, introducing the balls between the exterior cup ring and the cone or interior race ring, fourth, properly introducing the other exterior cup ring within the jacket, and lastly shearing and swaging from the jacket other interiorly projecting supporting means into holding contact with the outer cup ring last introduced.

In testimony whereof I have signed my name to this specification.

JOHN W. SCHATZ.